US009218801B2

(12) United States Patent
Reilly et al.

(10) Patent No.: US 9,218,801 B2
(45) Date of Patent: Dec. 22, 2015

(54) AURAL SMOOTHING OF A VEHICLE

(75) Inventors: Scott M. Reilly, Davisburg, MI (US); Timothy R. Bohn, Dexter, MI (US); Larry G. Hartleip, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 197 days.

(21) Appl. No.: 12/893,291

(22) Filed: Sep. 29, 2010

(65) Prior Publication Data

US 2012/0078465 A1 Mar. 29, 2012

(51) Int. Cl.
*G06F 7/00* (2006.01)
*G10K 11/175* (2006.01)
*G10K 11/178* (2006.01)

(52) U.S. Cl.
CPC ............ *G10K 11/175* (2013.01); *G10K 11/178* (2013.01); *G10K 2210/1282* (2013.01); *G10K 2210/3033* (2013.01); *G10K 2210/51* (2013.01)

(58) Field of Classification Search
CPC ..................... G10K 2210/1282; G10K 11/178
USPC ......................................... 701/36; 381/56–57
See application file for complete search history.

(56) References Cited

U.S. PATENT DOCUMENTS 5,170,433 A * 12/1992 Elliott et al. .................. 704/226
5,245,664 A * 9/1993 Kinoshite et al. ............ 381/71.4
5,359,662 A * 10/1994 Yuan et al. ................. 381/71.14
5,426,705 A * 6/1995 Yokota et al. ................ 381/71.4
5,485,523 A * 1/1996 Tamamura et al. .......... 381/71.4
5,493,616 A * 2/1996 Iidaka et al. ................. 381/71.4
5,581,619 A * 12/1996 Shibata et al. ............... 381/71.4
5,635,903 A * 6/1997 Koike et al. ................... 340/441
5,692,052 A * 11/1997 Tanaka et al. ................ 381/71.9
7,058,487 B2 * 6/2006 Hara et al. ...................... 701/22
7,088,829 B1 * 8/2006 Schick et al. ................ 381/71.4
7,203,321 B1 * 4/2007 Freymann et al. .............. 381/61
7,620,188 B2 * 11/2009 Inoue et al. .................. 381/71.4
7,775,320 B2 * 8/2010 McCain et al. ............... 181/206
7,876,910 B2 * 1/2011 Sakamoto et al. ........... 381/71.4
7,891,332 B2 * 2/2011 Shin et al. .................. 123/192.1
7,899,607 B2 * 3/2011 Shin et al. ...................... 701/111
8,027,484 B2 * 9/2011 Yoshida et al. .............. 381/71.4
8,045,723 B2 * 10/2011 Kobayashi et al. ............. 381/61
8,111,834 B2 * 2/2012 Kobayashi et al. .......... 381/71.4
8,634,571 B2 1/2014 Sakamoto et al.
8,942,836 B2 * 1/2015 Inoue et al. ...................... 700/94
2004/0086135 A1 * 5/2004 Vaishya ....................... 381/71.4
2005/0038576 A1 * 2/2005 Hara et al. ....................... 701/22
2006/0056642 A1 * 3/2006 Inoue et al. ................ 381/71.11
2007/0160227 A1 * 7/2007 Kogure et al. .................. 381/86

(Continued)

FOREIGN PATENT DOCUMENTS

WO 2010050264 A1 5/2010

OTHER PUBLICATIONS

Chinese Office Action for Application No. 201110348799.X dated Jan. 6, 2014; 7 pages.

*Primary Examiner* — Nicholas Kiswanto
*Assistant Examiner* — Harry Oh
(74) *Attorney, Agent, or Firm* — Cantor Colburn LLP

(57) ABSTRACT

A method of controlling sounds associated with a vehicle is provided. The method includes performing on a processor, monitoring powertrain data; determining a powertrain transition event based on the powertrain data; and selectively controlling the generation of one or more tones based on the powertrain transition event.

15 Claims, 5 Drawing Sheets

(56) References Cited

U.S. PATENT DOCUMENTS

| | | | | |
|---|---|---|---|---|
| 2008/0192948 | A1* | 8/2008 | Kan et al. | 381/71.4 |
| 2009/0028353 | A1* | 1/2009 | Kobayashi et al. | 381/61 |
| 2009/0205903 | A1* | 8/2009 | Evert et al. | 181/206 |
| 2009/0236173 | A1* | 9/2009 | McCain et al. | 181/206 |
| 2010/0014685 | A1* | 1/2010 | Wurm | 381/71.11 |
| 2010/0195844 | A1* | 8/2010 | Christoph et al. | 381/71.11 |
| 2010/0266135 | A1* | 10/2010 | Theobald et al. | 381/71.4 |
| 2010/0290635 | A1* | 11/2010 | Shridhar et al. | 381/71.1 |
| 2011/0280410 | A1* | 11/2011 | Matono et al. | 381/71.1 |
| 2012/0070012 | A1* | 3/2012 | Yoshizawa et al. | 381/71.4 |
| 2012/0078465 | A1* | 3/2012 | Reilly et al. | 701/36 |

* cited by examiner

AURAL SMOOTHING OF A VEHICLE

FIELD OF THE INVENTION

Exemplary embodiments of the present invention are related to systems and methods for performing aural smoothing in a vehicle.

BACKGROUND

Vehicle control systems monitor vehicle power demands and selectively control one or more powertrain components such that an improved fuel economy can be provided. For example, during low power consumption activity, the vehicle control systems can transition the powertrain from operating an engine to operating a motor. Likewise, during high power consumption activity, the vehicle control system can transition the powertrain from operating the motor to operating the engine. Such transitions can cause abrupt changes in the sounds emitted from the vehicle. Unexpected abrupt changes in sound can be undesirable to a vehicle operator. Accordingly, it is desirable to provide systems and methods for improving the overall soundscape of a vehicle.

SUMMARY

In one exemplary embodiment, a method of controlling sounds associated with a vehicle is provided. The method includes performing on a processor, monitoring powertrain data; determining a powertrain transition event based on the powertrain data; and selectively controlling the generation of one or more tones based on the powertrain transition event.

The above features and advantages and other features and advantages of the present invention are readily apparent from the following detailed description of the best modes for carrying out the invention when taken in connection with the accompanying drawings.

BRIEF DESCRIPTION OF THE DRAWINGS

Other objects, features, advantages and details appear, by way of example only, in the following detailed description of embodiments, the detailed description referring to the drawings in which.

DESCRIPTION OF THE EMBODIMENTS

Figure 1:
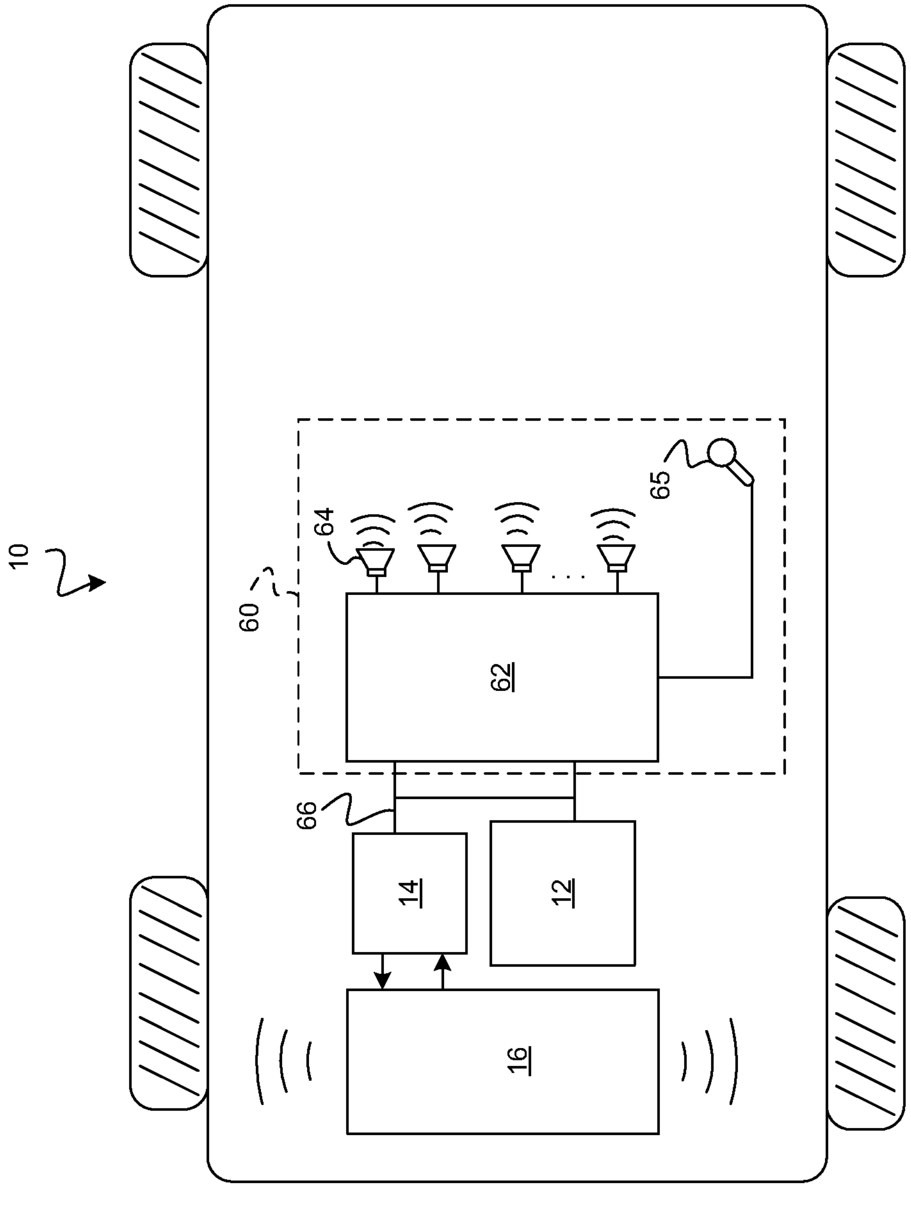
FIG. 1 is an illustration of a vehicle including an aural smoothing system in accordance with an exemplary embodiment.

The following description is merely exemplary in nature and is not intended to limit the present disclosure, application or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

In accordance with an exemplary embodiment of the present invention a vehicle is shown generally at 10. The vehicle includes an aural smoothing system 12. The aural smoothing system 12 communicates with one or more control modules 14. The one or more control modules 14 (hereinafter referred to as control module) control a powertrain 16 of the vehicle 10. The powertrain 16 includes one or more sources of propulsion for the vehicle 10.

Figure 2:
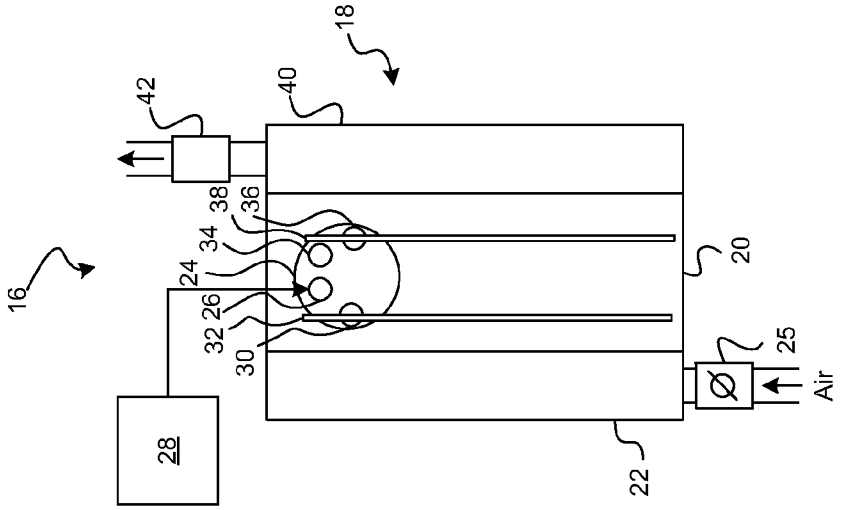
FIGS. 2 through 4 are illustrations of various powertrain configurations of the vehicle in accordance with an exemplary embodiment.

In various embodiments, as shown in FIG. 2, the powertrain 16 includes an engine system 18. The engine system 18 includes an internal combustion engine 20 that combusts an air and fuel mixture to produce drive torque. As can be appreciated, the aural smoothing system 12 is applicable to various engines 20 and is not limited to the present example.

In the example engine system 18, air is drawn into an intake manifold 22 through a throttle 25. The throttle 25 regulates mass airflow into the intake manifold 22. Air within the intake manifold 22 is distributed into cylinders 24. Although a single cylinder 24 is illustrated, it can be appreciated that the aural smoothing system of the present disclosure can be implemented in engines 20 having a plurality of cylinders 24 including, but not limited to, 2, 3, 4, 5, 6, 8, 10, 12 and 16 cylinders arranged in a v-type flat or inline configuration.

A fuel injector 26 injects fuel that is combined with the air as it is drawn into the cylinder 24 through an intake port. The fuel injector 26 may be an injector associated with an electronic or mechanical fuel injection system 28, a jet or port of a carburetor or another system for mixing fuel with intake air. The fuel injector 26 is controlled to provide a desired air-to-fuel (A/F) ratio within each cylinder 24.

An intake valve 30 selectively opens and closes to enable the air/fuel mixture to enter the cylinder 24. The intake valve position is regulated by an intake camshaft 32. A piston (not shown) compresses the air/fuel mixture within the cylinder 24. A spark plug 34 initiates combustion of the air/fuel mixture, which drives the piston in the cylinder 24. The piston, in turn, drives a crankshaft (not shown) to produce drive torque. Combustion exhaust within the cylinder 24 is forced out of an exhaust port when an exhaust valve 36 is in an open position. The exhaust valve position is regulated by an exhaust camshaft 38. The exhaust exits the engine 20 through an exhaust manifold 40, is treated in an exhaust system 42, and is released to atmosphere.

In various embodiments, the engine 20 is controlled to selectively activate and deactivate the operation of one or more cylinders 24 to accommodate the changes in power demands of the vehicle 10. For example, an eight cylinder engine can be controlled to transition from operating with four cylinders firing to operating with eight cylinders firing due to an increase in a power demand. Such transition can be referred to as an activation transition. In another example, the eight cylinder engine can be controlled to transition from operating with eight cylinders firing to operating with four cylinders firing due to a decrease in a power demand. Such transition can be referred to as a deactivation transition.

Figure 3:
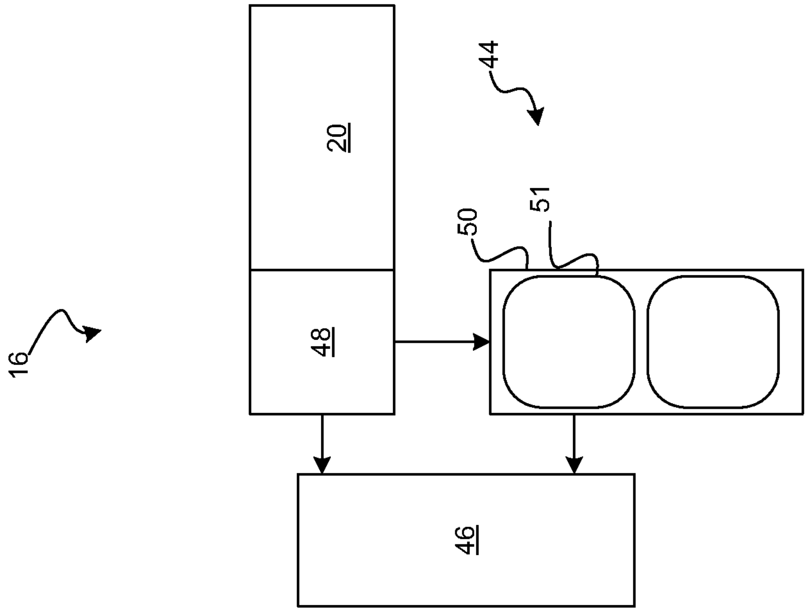

In various other embodiments, as shown in FIG. 3, the powertrain 16 includes a hybrid system 44 that includes an engine 20 and an electric drive motor 46. The hybrid system 44 can be arranged in a series configuration (as shown), in a parallel configuration, or in a series-parallel configuration. When in the series configuration, the engine 20 drives a generator 48 to generate electricity. The electricity is stored in an energy storage system 50 (e.g., a plurality of batteries 51) or is sent to the electric drive motor 46. The electric drive motor 46 functions as the primary source of propulsion of the vehicle 10 by driving the wheels. The electric drive motor 46 operates based on energy from the energy storage system 50 and/or from the engine 20. The engine 20 is an internal combustion engine, for example, as discussed with regard to FIG. 2.

When in the parallel configuration (configuration not shown), the engine 20 and the electric drive motor 46 each function as a source of propulsion of the vehicle 10. The engine 20 and the electric drive motor 46 can operate together to propel the vehicle 10 and/or individually based on torque demands.

Figure 4:
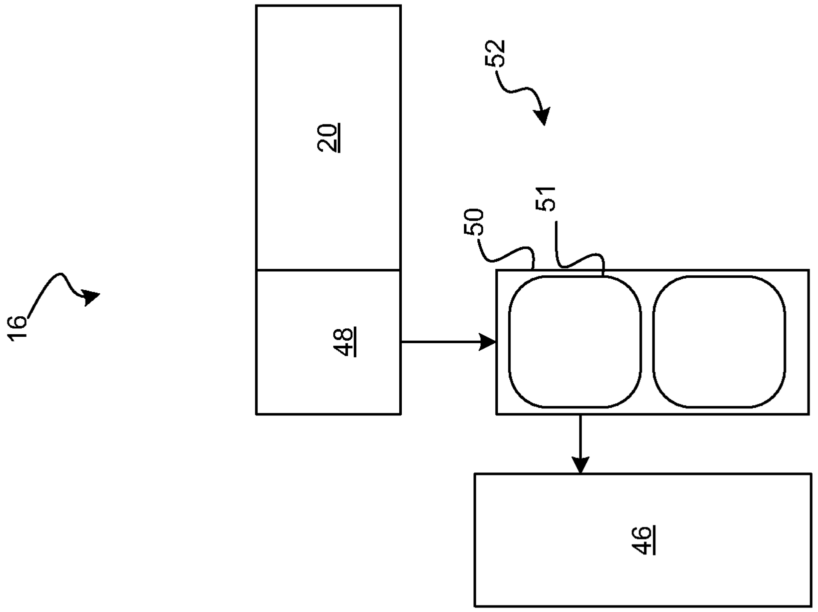

In various other embodiments, as shown in FIG. 4, the powertrain is a pure electric system 52 that includes the electric drive motor 46. The electric drive motor 46 operates on energy from the energy storage system 50. The energy storage system 50 can be charged via an exterior power source (i.e., by plugging into a home outlet). In such an arrangement, an engine 20 can be provided as an alternative charging source to charge the energy storage system 50 when the state of charge is low, thus, providing an extended range of use.

With reference back to FIG. 1, the aural smoothing system 12 further communicates with an infotainment system 60. Amongst other functions typical to vehicle infotainment systems, the infotainment system 60 includes an infotainment module 62 that manages the generation of various sounds within the vehicle 10 and/or outside of the vehicle 10 through one or more speakers 64. The speakers 64 can be located within the vehicle interior, under the vehicle hood, and/or on an exterior of the vehicle 10.

As can be appreciated, the aural smoothing system 12 can be integrated within the control module 14, can be integrated within the infotainment module 62, or can be separate from the control module 14 and the infotainment module 62 and can communicate with each via a vehicle communication network 66. For exemplary purposes, the disclosure will be discussed in the context of the aural smoothing system 12 being separate from and in communication with the infotainment module 62 and the control module 14.

In various embodiments, the aural smoothing system 12 monitors data that is generated by the control module 14 and that is communicated on the communication network 66. Based on the data, the aural smoothing system 12 identifies powertrain transition events and performs one or more sound management methods. The sound management methods communicate with the infotainment system 60 to perform aural smoothing of sounds generated by the vehicle 10. In various embodiments, the sound management methods can include one or more active noise cancellation methods and/or one or more sound blending methods. In various embodiments, the active noise cancellation methods remove objectionable sounds generated by the powertrain 16. In various embodiments, the sound blending methods introduce one or more sounds to blend sounds generated by the powertrain 16.

Figure 5:
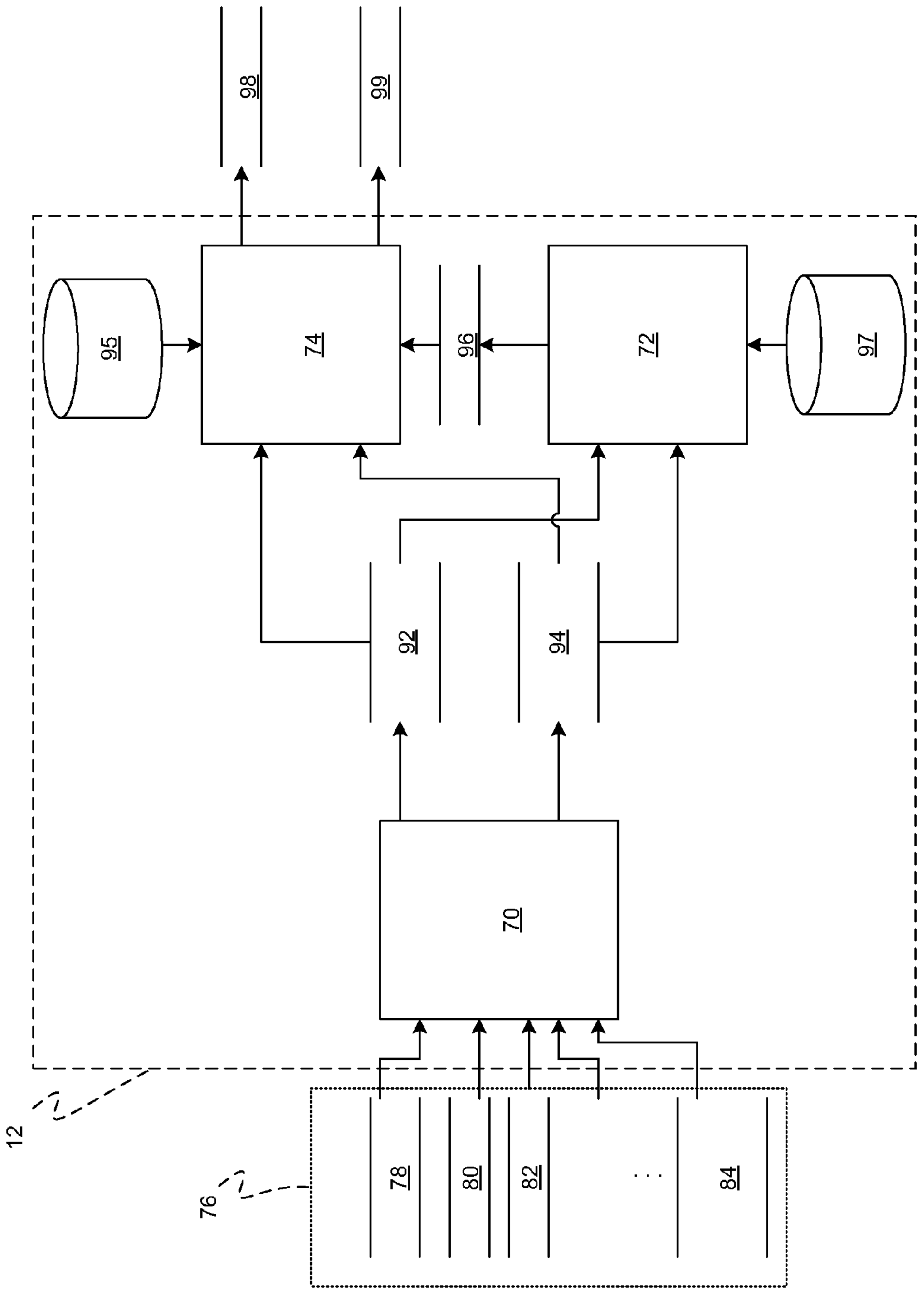
FIG. 5 is a dataflow diagram illustrating an aural smoothing system in accordance with an exemplary embodiment.

Referring now to FIG. 5, a dataflow diagram illustrates various embodiments of the aural smoothing system 12. As can be appreciated, various embodiments of aural smoothing systems 12 according to the present disclosure may include any number of modules. As can be appreciated, the modules shown in FIG. 5 may be combined and/or further partitioned to similarly perform aural smoothing. Inputs to the aural smoothing system 12 may be sensed directly from the vehicle 10 (FIG. 1), received from other modules within the vehicle 10 (FIG. 1), for example, via the vehicle communication network 66 (FIG. 1), and/or determined/modeled by other modules (not shown) of the aural smoothing system 12. In various embodiments, the aural smoothing system 12 includes a transition determination module 70, a tone manager module 72, and a speaker manager module 74.

The transition determination module 70 receives as input powertrain data 76. Such powertrain data 76 can include, for example, but is not limited to, engine torque 78, manifold absolute pressure 80, engine speed 82, engine activation/deactivation signals 84, or other signals indicative of transition events.

Based on the powertrain data 76, the transition determination module 70 determines a transition type 92 and/or a transition stage 94. The transition type 92 indicates the type of transition occurring. For example, when the powertrain 16 (FIG. 1) includes the engine system 18 (FIG. 2) that can perform activation and deactivation transitions, the transition type 92 can be a deactivation transition or an activation transition. In another example, when the powertrain 16 (FIG. 1) includes the hybrid system 44 (FIG. 3), the transition type 92 can be, for example, an engine start transition, an engine stop transition, a motor start transition, or a motor stop transition. In yet another example, when the powertrain 16 (FIG. 1) includes an electric system 52 (FIG. 4) with or without an engine 20 (FIG. 4) for extended range, the transition type 92 can be, for example, a motor start transition, a motor stop transition, an engine start transition, or an engine stop transition. The transition determination module 70 determines the transition type 92 by evaluating the powertrain data 76 against predetermined transition data.

The transition stage 94 indicates a stage of the transition occurring. In various embodiments, the transition stage 94 can merely identify the transition and can be for example, transition, or no transition. In various other embodiments, the transition stage 94 can identify stages of the transition and can be, for example, entering the transition, transitioning, exiting the transition, transition complete, or no transition. The transition determination module 70 determines the transition stage 94 by evaluating the powertrain data 76 against predetermined transition data.

The tone manager module 72 receives as input the transition stage 94 and/or the transition type 92. Based on the inputs 92, 94, the tone manager module 72 identifies one or more tones 96 that can counteract (e.g., by masking, blending or cancellation) the amplitude, frequency, and timing of the sounds emitted by the powertrain 16 (FIG. 1) during that transition type 92 and/or transition stage 94. In some cases, additional tones 96 can be introduced. In some cases, tones 96 can reduce sounds emitted by the powertrain 16 (FIG. 1) through active noise cancellation. In various embodiments, tone information is predetermined and stored in a datastore 97 in a two or three dimensional table format based on the transition stage 94 and/or the transition type 92. The tones 96 can then be accessed in real time using a table lookup function. These tones are then manipulated using the various powertrain control signals, such as, engine torque and engine speed, such that they mask, blend, and/or cancel the intended sounds emitted by the powertrain 16 (FIG. 1). In various other embodiments, the tones are estimated based on one or more tone estimating equations.

In various embodiments, the tone manager module 72 can determine in-vehicle tones and/or outside the vehicle tones to be used in the aural smoothing. The tones 96 can be predetermined and stored in the datastore 97 as two or more tables based on the transition stage 94 and/or the transition type 92. Alternatively, the tones 96 can be estimated based on one or more tone estimating equations.

The speaker manager module 74 receives as input the selected tones 96, and the transition type 92 and/or the transition stage 94. Based on the inputs, 92, 94, 96, the speaker manager module 74 determines when to generate the tones 96 and further determines which speakers 64 (FIG. 1) should project the tones 96. Based on when to generate the tones 96 and the selected speakers 64 (FIG. 1), the speaker manager module 74 generates one or more signals 98. In various embodiments, the signals 98, 99 are communicated to the infotainment module 62 (FIG. 1) so that the infotainment module 62 (FIG. 1) can control the selected speakers 64 (FIG. 1) to project the selected tones 96. In various other embodiments, the signals 98, 99 are communicated directly to the selected speakers 64 (FIG. 1) to project the selected tones 96. For example, by projecting the selected tones 96 through the selected speakers 64 (FIG. 1), the sounds can be blended across the transitions through the introduction of masking sounds or ramping in sounds. The timing of the tone control can be based on the transition stage. For example, the timing of the tone control can be longer than the time of the actual transition so that the sound transition is longer and hence harder to perceive.

Figure 6:
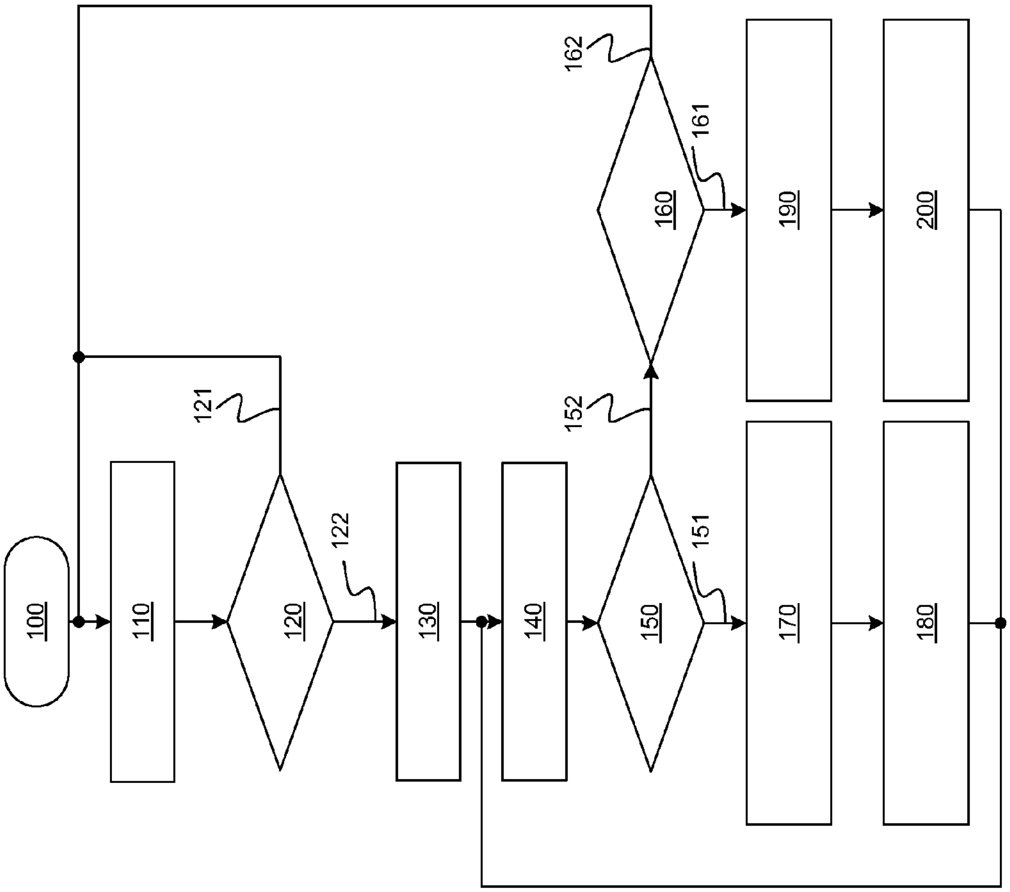
FIG. 6 is a flowchart illustrating an aural smoothing method in accordance with an exemplary embodiment.

Referring now to FIG. 6, and with continued reference to FIG. 5, a flowchart illustrates aural smoothing methods that can be performed by the aural smoothing system 12 of FIG. 5 in accordance with the present disclosure. As can be appreciated in light of the disclosure, the order of operation within the method is not limited to the sequential execution as illustrated in FIG. 6, but may be performed in one or more varying orders as applicable and in accordance with the present disclosure. As can further be appreciated, one or more steps may be added or removed without altering the spirit of the method.

In various embodiments, the method can be scheduled to run based on predetermined events, and/or run continually during operation of the vehicle 10 (FIG. 1) (as shown).

In one example, the method may begin at 100. The powertrain data 76 is monitored at 110 and a transition event is evaluated at 120. If the powertrain data 76 indicates a transition event has not occurred at 121, the method continues with monitoring the powertrain status data at 110.

If, however, the powertrain data 76 indicates that a transition event is occurring at 122, the transition type 92 is determined at 130 and/or the transition stage 94 is determined at 140. The transition stage 94 is then evaluated at 150 and 160.

If the transition stage 94 indicates, for example, entering the transition at 151, the tones 96 are selected based on the transition type 92 and/or the transition stage 94 at 170. For example, tones that provide active noise cancellation and blending can be selected during the entering the transition stage. Further based on the transition type 92 and/or the transition stage 94, one or more speakers 64 (FIG. 1) are selectively controlled to project the selected tones 96 via signals 98, 99 at 180. Thereafter, the method continues with determining the transition stage 94 at 140.

If, however, the transition stage 94 does not indicate entering the transition at 152, rather, it indicates transitioning or exiting the transition at 161, the selected tones 96 are adjusted based on the transition type 92 and/or the transition stage 94 at 190. For example, the tones 96 that provide the blending can be selected during the transitioning stage and/or the exiting the transition stage. Once the tones have been selected, further based on the transition type 92 and/or the transition stage 94, one or more speakers 64 (FIG. 1) are selectively controlled to project the selected tones 96 at 200.

The method of selecting the tones and controlling the speakers continues until the transition stage indicates that the transition is complete or until there is no transition at 162. Thereafter, the method continues with monitoring the powertrain data 94 for another transition event at 110.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:

1. A method of managing sounds associated with a vehicle having a powertrain that includes an engine, the method comprising:

performing on a processor, monitoring powertrain data associated with the powertrain, the data being indicative of a transition type and a transition stage of a powertrain transition event between an engine and an electric drive motor, one or more undesired transition sounds being emitted by said powertrain during said powertrain transition event;

determining the transition type based on the powertrain data, the transition type being at least one of an engine start transition, an engine stop transition, an electric motor start transition, and an electric motor stop transition;

determining a transition stage based on the powertrain data, the transition stage indicating a stage of the powertrain transition event, the transition stage including at least one of entering the powertrain transition event, going through the powertrain transition event, exiting the powertrain transition event, and completing the powertrain transition event; and selectively controlling the generation of one or more tones based on the transition type and the transition stage;

said selectively controlling comprising identifying, based on said transition type and said transition stage:

one or more predetermined tones configured to mask, blend or cancel one or more of said one or more undesired transition sounds emitted by said powertrain during said powertrain transition event, the one or more tones are configured to counteract timing of the sounds, wherein counteracting the timing of the sounds includes generating the one or more tones for a duration of time that exceeds a duration of the powertrain transition event; and which speakers, of a plurality of speakers in the vehicle, to distribute the one or more tones;

said identifying comprising accessing predetermined tone information from a datastore based on the transition type and the transition stage.

2. The method of claim 1 wherein the one or more predetermined tones are configured to mask, one or more of said one or more undesired transition sounds emitted by said powertrain during said powertrain transition event.

3. The method of claim 1 wherein the one or more predetermined tones are configured to blend one or more of said one or more undesired transition sounds emitted by said powertrain during said powertrain transition event.

4. The method of claim 1 wherein determining the powertrain transition event comprises determining a transition type based on the powertrain data and wherein the controlling the generation of the one or more tones is based on the transition type that indicates the type of transition.

5. An aural smoothing system for a vehicle having a powertrain that includes an engine, the aural smoothing system comprising:

a transition determination module configured to monitor powertrain data, to determine a transition event between an engine and an electric drive motor based on the powertrain data, and to determine a transition stage based on the powertrain data, the transition stage including at least one of entering the powertrain transition event, going through the powertrain transition event, exiting the powertrain transition event, and completing the powertrain transition event, one or more undesired transition sounds being emitted by said powertrain during said powertrain transition event; and a tone manager module configured to select one or more predetermined tones from a datastore based on the transition type and the transition stage, the powertrain transition event being at least one of an engine start transition, an engine stop transition, an electric motor start transition, and an electric motor stop transition;

said one or more predetermined tones being configured mask, blend or cancel one or more of said one or more undesired transition sounds emitted by said powertrain during said powertrain transition event, the one or more tones are configured to counteract timing of the sounds, wherein counteracting the timing of the sounds includes generating the one or more tones for a duration of time that exceeds a duration of the powertrain transition event; and a speaker manager module that selectively controls one or more speakers based on the selected one or more tones, the transition type and the transition stage.

6. The system of claim 5 wherein the transition determination module determines a transition type that indicates the type of transition occurring.

7. A vehicle having a powertrain that includes an engine, the vehicle comprising:

a control module configured to selectively control one or more components of the powertrain and to generate powertrain data; and an aural smoothing system configured to monitor the powertrain data, to determine a transition event and a transition stage between and engine and an electric drive motor based on the powertrain data, and to selectively determine one or more tones based on the transition event and transition stage by accessing predetermined tone information in a datastore, the powertrain transition event being at least one of a deactivation transition of one or more engine cylinders, an activation transition of one or more engine cylinders, an engine start transition, an engine stop transition, an electric motor start transition, and an electric motor stop transition, and the transition stage based on the powertrain data, the transition stage including entering the powertrain transition event, going through the powertrain transition event, exiting the powertrain transition event, and completing the powertrain transition event, one or more undesired transition sounds being emitted by said powertrain during said powertrain transition event;

the aural smoothing system further configured to identify, based on the transition event and the transition stage, which speakers, of a plurality of speakers in the vehicle, to distribute the one or more tones;

said one or more tones being configured mask, blend or cancel one or more of said one or more undesired transition sounds emitted by said powertrain during said powertrain transition event, the one or more tones are configured to counteract timing of the sounds, wherein counteracting the timing of the sounds includes generating the one or more tones for a duration of time that exceeds a duration of the powertrain transition event.

8. The vehicle of claim 7 wherein the aural smoothing system selectively controls the generation of the one or more tones by communicating with an infotainment system.

9. The method of claim 1, wherein said one or more tones are configured to counteract an amplitude of the sounds.

10. The method of claim 1, wherein said one or more tones are configured to counteract a frequency of the sounds.

11. The method of claim 1, wherein said one or more tones are configured to counteract amplitude and frequency of the sounds.

12. The method of claim 1, wherein said identifying comprises estimating the tones based on one or more tone estimating equations.

13. The method of claim 1, wherein selection of the tones and selection of the speakers are performed as part of a two-step process.

14. The method of claim 1, wherein determining a transition stage based on the powertrain data includes determining each of entering the powertrain transition event, going through the powertrain transition event, exiting the powertrain transition event, and completing the powertrain transition event.

15. The system of claim 5, wherein the transition determination module is configured to determine each of entering the powertrain transition event, going through the powertrain transition event, and exiting the powertrain transition event.

* * * * *